US008438854B2

(12) United States Patent
Nolcheff

(10) Patent No.: US 8,438,854 B2
(45) Date of Patent: May 14, 2013

(54) PRE-DIFFUSER FOR CENTRIFUGAL COMPRESSOR

(75) Inventor: Nick A. Nolcheff, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 958 days.

(21) Appl. No.: 12/126,704

(22) Filed: May 23, 2008

(65) Prior Publication Data

US 2009/0304502 A1 Dec. 10, 2009

(51) Int. Cl.
*F02C 1/00* (2006.01)

(52) U.S. Cl.
USPC .......... 60/751

(58) Field of Classification Search .......... 60/726, 60/751; 415/191, 193, 194, 211.2
See application file for complete search history.

(56) References Cited

U.S. PATENT DOCUMENTS

| | | | | |
|---|---|---|---|---|
| 2,581,999 | A | 1/1952 | Blatz | |
| 2,584,899 | A * | 2/1952 | McLeod | 415/115 |
| 2,711,072 | A * | 6/1955 | Wetzler | 60/39.37 |
| 3,088,279 | A * | 5/1963 | Diedrich | 60/804 |
| 3,978,664 | A * | 9/1976 | Parker et al. | 60/726 |
| 4,272,955 | A * | 6/1981 | Hoffman et al. | 60/804 |
| 4,327,547 | A | 5/1982 | Hughes et al. | |
| 4,344,737 | A * | 8/1982 | Liu | 415/199.1 |
| 4,527,386 | A | 7/1985 | Markowski | |
| 4,918,926 | A | 4/1990 | Nikkanen | |
| 5,303,543 | A * | 4/1994 | Shah et al. | 60/804 |
| 6,035,627 | A * | 3/2000 | Liu | 60/785 |
| 6,279,322 | B1 * | 8/2001 | Moussa | 60/751 |
| 7,181,914 | B2 | 2/2007 | Pidcock et al. | |
| 2007/0036646 | A1 * | 2/2007 | Nguyen et al. | 415/208.3 |

FOREIGN PATENT DOCUMENTS

EP 1818511 A2 8/2007

OTHER PUBLICATIONS

European search report for Application No. 09160845, mailed on Jul. 1, 2009.
EP Communication for EP 09160845.5-2301 dated Jan. 4, 2012.

* cited by examiner

*Primary Examiner* — Phutthiwat Wongwian
(74) *Attorney, Agent, or Firm* — Ingrassia Fisher & Lorenz, P.C.

(57) ABSTRACT

A diffuser system for a compressor for a gas turbine engine, the compressor having an impeller and the gas turbine engine having a combustor and a fuel injector proximate to the combustor, includes a first diffuser and a second diffuser. The first diffuser is configured to receive compressed air from the impeller. The second diffuser is coupled to receive the compressed air from the first diffuser. The second diffuser comprises a housing comprising a first wall and a second wall. The first and second walls form a diffuser flow passage therebetween. The first wall or the second wall, or both, further form an opening through the first and second walls for the fuel injector to pass through when removed from the combustor.

19 Claims, 5 Drawing Sheets

PRE-DIFFUSER FOR CENTRIFUGAL COMPRESSOR

TECHNICAL FIELD

The present invention relates to gas turbine engines, and more particularly relates to diffusers for gas turbine engines with centrifugal compressors.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. Generally, a gas turbine engine includes a combustor, a power turbine, and a compressor. During operation of the engine, the compressor draws in ambient air, compresses it, and supplies compressed air to the combustor. The compressor also typically includes a diffuser that diffuses the compressed air before it is supplied to the combustor. The combustor receives fuel from a fuel source and the compressed air from the compressor, and supplies high energy compressed air to the power turbine, causing it to rotate. The power turbine includes a shaft that may be used to drive the compressor.

Gas turbine engines generally take the form of an axial compressor or a centrifugal compressor, or some combination of both (i.e., an axial-centrifugal compressor). In an axial compressor, the flow of air through the compressor is at least substantially parallel to the axis of rotation. In a centrifugal compressor, the flow of air through the compressor is turned at least substantially perpendicular to the axis of rotation. An axial-centrifugal compressor includes an axial section (in which the flow of air through the compressor is at least substantially parallel to the axis of rotation) and a centrifugal section (in which the flow of air through the compressor is turned at least substantially perpendicular to the axis of rotation).

As mentioned above, compressors often include a diffuser to reduce the velocity of the air traveling from the compressor to the combustor, for example in a gas turbine engine with a through flow combustor. In addition, certain centrifugal compressors have both a first diffuser located relatively early in the compressor flow passage away from the combustor and a second diffuser (often called a pre-diffuser) located later in the flow passage proximate the combustor. However, to date, it has been difficult to implement such additional diffusers, or pre-diffusers, in connection with centrifugal compressors. Specifically, it has been difficult to implement such an additional diffuser in close proximity to the combustor of the gas turbine engine, because there generally needs to be significant space between the additional diffuser and the combustor to allow for the insertion and removal of fuel injectors from and to the combustor, for example for servicing. As a result, any placement of such a pre-diffuser in a centrifugal compressor would generally result in an undesirable increase in the length and/or weight of the engine.

Accordingly, there is a need for an improved diffuser system for a compressor, such as a centrifugal compressor, for example that potentially reduces pressure loss, or dump loss. There is also a need for a compressor, such as a centrifugal compressor, with an improved diffuser system, for example that potentially reduces pressure loss, or dump loss. There is a further need for a gas turbine engine with a compressor, such as a centrifugal compressor, with an improved diffuser system, for example that potentially reduces pressure loss, or dump loss. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment of the present invention, a diffuser system for a compressor for a gas turbine engine, the compressor having an impeller and the gas turbine engine having a combustor and a fuel injector proximate to the combustor, is provided. The diffuser system comprises a first diffuser and a second diffuser. The first diffuser is configured to receive compressed air from the impeller. The second diffuser is coupled to receive the compressed air from the first diffuser. The second diffuser comprises a housing comprising a first wall and a second wall. The first and second walls form a diffuser flow passage therebetween. The first wall or the second wall, or both, further form an opening through the first and second walls for the fuel injector to pass through when removed from the combustor.

In accordance with another exemplary embodiment of the present invention, a compressor for a gas turbine engine having a combustor and a fuel injector proximate thereto is provided. The compressor comprises a housing, an impeller, a first diffuser, and a second diffuser. The impeller is rotationally mounted within the housing, and is configured to supply compressed air. The first diffuser is formed within the housing, and is configured to receive the compressed air from the impeller. The second diffuser is formed within the housing, and is coupled to receive the compressed air from the first diffuser. The second diffuser is formed at least in part by a first wall and a second wall of the housing. The first and second walls form a diffuser flow passage of the second diffuser between the first and second walls. The first wall or the second wall, or both, further form an opening through the first and second walls for the fuel injector to pass through when removed from the combustor.

In accordance with a further exemplary embodiment of the present invention, a gas turbine engine is provided. The gas turbine engine comprises a housing, a turbine, a combustor, a fuel injector, and a compressor. The turbine is formed within the housing, is configured to receive a combustion gas, and is operable, upon receipt thereof, to supply a first drive force. The combustor is formed within the housing, is configured to receive compressed air and fuel, and is operable, upon receipt thereof, to supply the combustion gas to the turbine. The fuel injector is coupled to the combustor, and is configured to supply the fuel thereto. The compressor is formed within the housing, and is configured to supply the compressed air to the combustor. The compressor comprises an impeller, a first diffuser, and a second diffuser. The impeller is rotationally mounted within the housing, and is configured to supply the compressed air. The first diffuser is formed within the housing, and is configured to receive the compressed air from the impeller. The second diffuser is formed within the housing, and is coupled to receive the compressed air from the first diffuser. The second diffuser is formed at least in part by a first wall and a second wall of the housing. The first and second walls form a diffuser flow passage of the second diffuser between the first and second walls. The first wall or the second wall, or both, further form an opening through the first and second walls for the fuel injector to pass through when removed from the combustor.

DETAILED DESCRIPTION

Before proceeding with a detailed description, it is to be appreciated that the described embodiment is not limited to use in conjunction with a particular type of turbine engine or particular type of compressor. Thus, although the present embodiment is, for convenience of explanation, depicted and described as being implemented in an engine having an axial-centrifugal compressor, a two-stage turbine, and other specific characteristics, it will be appreciated that it can be implemented as various other types of compressors, turbines, engines, turbochargers, and various other fluid devices, and in various other systems and environments.

Figure 1:
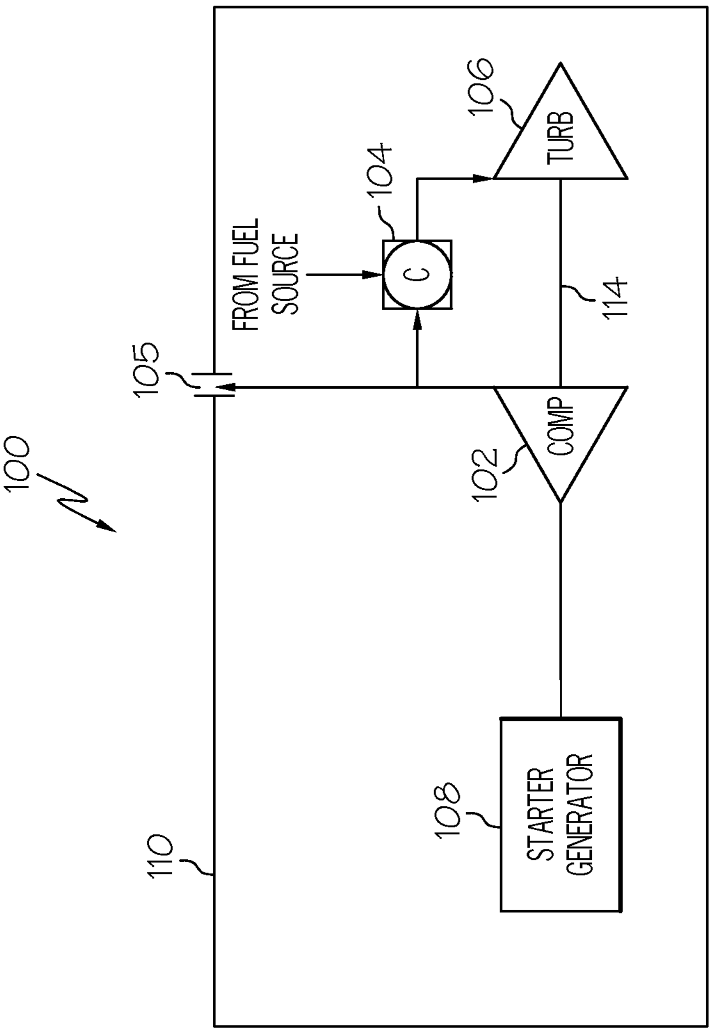
FIG. 1 is a schematic representation of a gas turbine engine, in accordance with an exemplary embodiment of the present invention.

Turning now to the description, and with reference first to FIG. 1, an embodiment of an exemplary gas turbine engine 100 is shown in a simplified cross-sectional format. In a preferred embodiment, the gas turbine engine 100 is part of a propulsion system for an aircraft. However, this may vary in other embodiments. The gas turbine engine 100 includes a compressor 102, a combustor 104, a turbine 106, and a starter-generator unit 108, all preferably housed within a single containment housing 110.

The compressor 102 is formed within the housing 110, and is configured to supply compressed air to the combustor 104. In a preferred embodiment depicted in FIG. 2 and described further below in connection therewith, the compressor 102 comprises an impeller, a first diffuser, and a second diffuser.

During operation of the gas turbine engine 100, the compressor 102 draws ambient air into the housing 110. The compressor 102 compresses the ambient air, and supplies a portion of the compressed air to the combustor 104, and may also supply compressed air to a bleed air port 105. The bleed air port 105, if included, is used to supply compressed air to a non-illustrated environmental control system. It will be appreciated that the compressor 102 may be any one of numerous types of compressors now known or developed in the future.

The combustor 104 is formed within the housing 110, and is configured to receive compressed air and fuel and operable, upon receipt thereof, to supply the combustion gas to the turbine. Specifically, in a preferred embodiment, the combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor 104 configuration used, the relatively high-energy combustion gas that is generated in the combustor 104 is supplied to the turbine 106. The turbine 106 is formed within the housing 110, and is configured to receive the combustion gas and, upon receipt thereof, to supply a first drive force. As the high-energy combustion gas expands through the turbine 106, it impinges on the turbine blades (not shown in FIG. 1), which causes the turbine 106 to rotate. The turbine 106 includes an output shaft 114 that drives the compressor 102.

Figure 2:
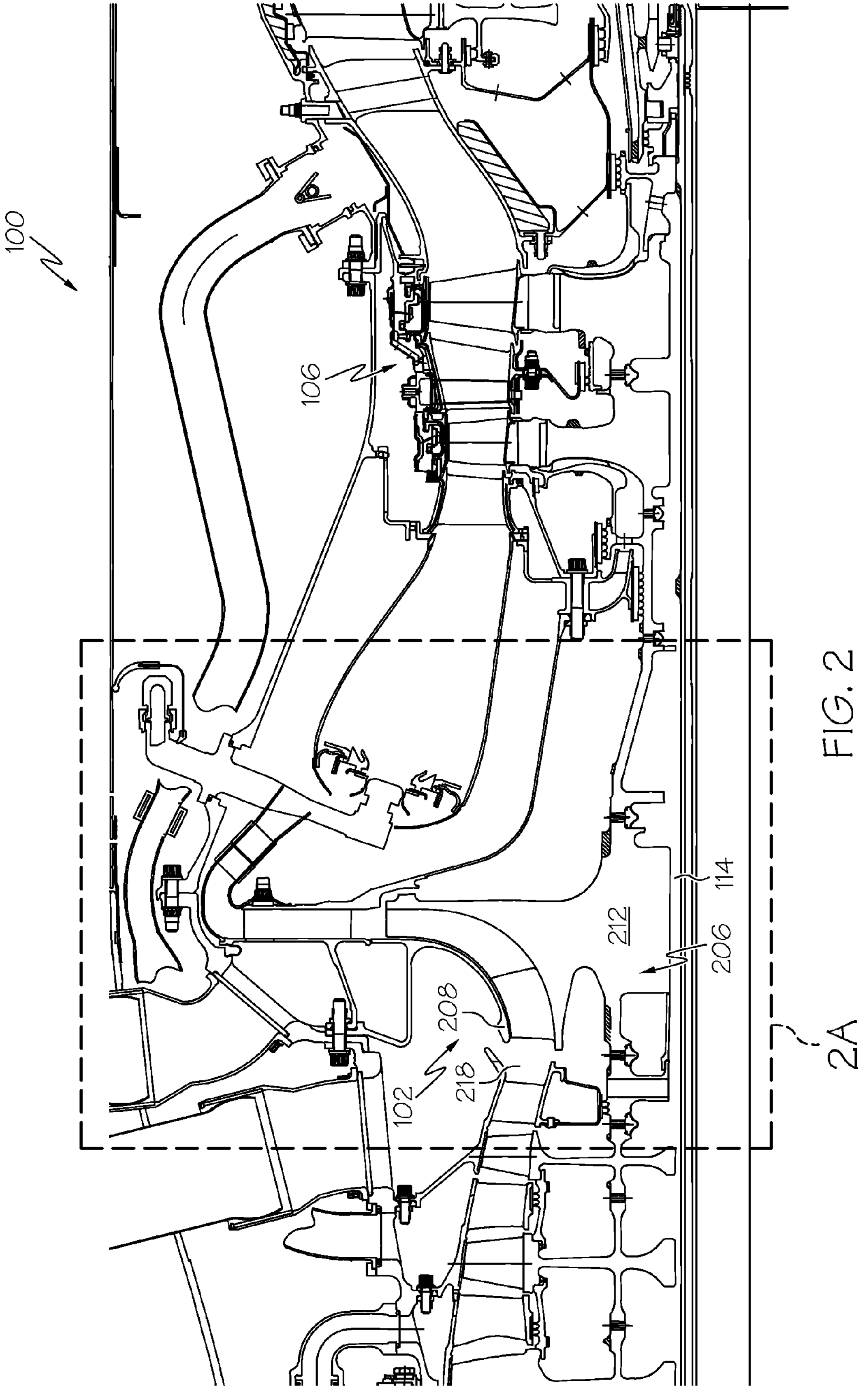
FIG. 2 is a cross sectional view of a portion of the gas turbine engine of FIG. 1, including a compressor, a combustor, and a turbine thereof, in accordance with an exemplary embodiment of the present invention.
Figure 2A:
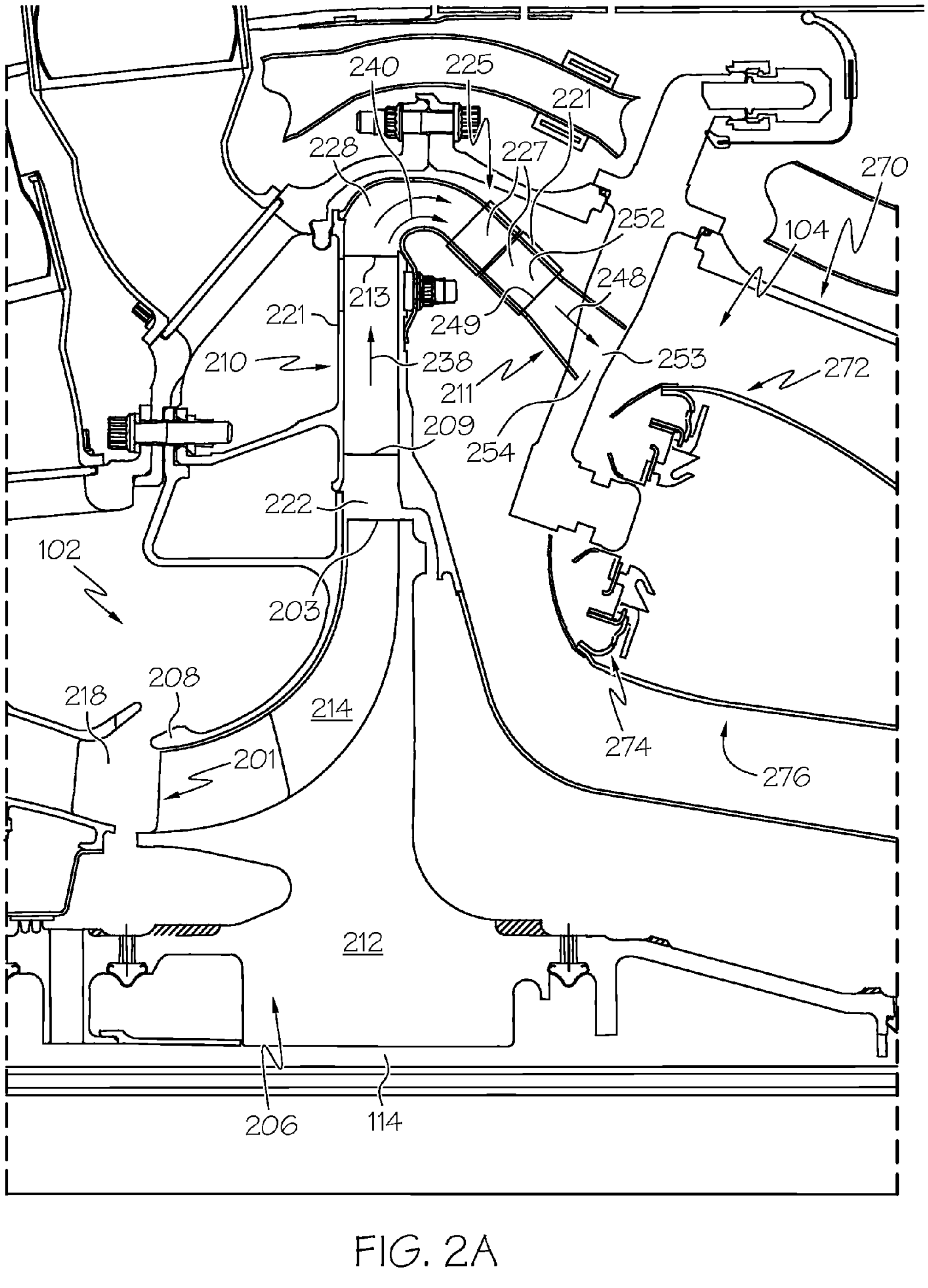

Turning now to FIG. 2, a cross sectional view of a portion of the gas turbine engine 100 of FIG. 1 is provided, including the compressor 102, the combustor 104, and the turbines 106 of FIG. 1, in accordance with an exemplary embodiment of the present invention. In the depicted embodiment, the compressor 102 is an axial-centrifugal compressor and includes an impeller 206, a shroud 208, a first diffuser 210, and a second diffuser 211. In some embodiments this may vary, for example in that a shroud may be unnecessary, and/or that one or more other features may vary.

The impeller 206 is preferably rotationally mounted within the housing 110, and is most preferably mounted on the output shaft 114 via a hub 212. The impeller 206 is thus rotationally driven by either the turbine 106 or the starter-generator 108, as described above. A plurality of spaced-apart blades 214 extend generally radially from the hub 212 and together therewith define an impeller leading edge 201 and an impeller trailing edge 203. As is generally known, when the impeller 206 is rotated, the blades 214 draw air into the impeller 206, via the impeller leading edge 201, and increase the velocity of the air to a relatively high velocity. The relatively high velocity air is then discharged from the impeller 206, via the impeller trailing edge 203.

The shroud 208 is disposed adjacent to, and partially surrounds, the impeller blades 214. The shroud 208, among other things, cooperates with an annular inlet duct 218 to direct the air drawn into the gas turbine engine 100 by the compressor 102 into the impeller 206.

The first diffuser 210 is formed within a diffuser housing 221, and is configured to receive the compressed air from the impeller 206. In certain embodiments the diffuser housing 221 may comprise the above-referenced housing 110, and/or may be formed within the housing 110.

In one preferred embodiment, the first diffuser 210 comprises a radial diffuser that is disposed adjacent to, and surrounds a portion of, the impeller 206. The first diffuser 210 is configured to direct a flow of compressed air with a radial component to a diffused annular flow having an axial component. The first diffuser 210 forms a first diffuser flow passage 238 through which air is transported and diffused after it is received from the first diffuser 210 from the impeller 206. The first diffuser 210 additionally reduces the velocity of the air and increases the pressure of the air to a higher magnitude.

In certain embodiment, the first diffuser 210 may include a plurality of first diffuser vanes (not depicted) formed within the diffuser housing 221, with each first diffuser vane defining a different first diffuser flow passage 238. However, this may vary in other embodiments.

The diffuser housing 221 also includes and defines a de-swirl section 225 between the first diffuser 210 and the second diffuser 211. The de-swirl section 225 is coupled between the first diffuser 210 and the second diffuser 211. The de-swirl section 225 comprises a plurality of de-swirl vanes 227 (shown generally in FIG. 2, and shown in greater detail in FIGS. 3 and 4, discussed further below) coupled between the first and second diffusers 210, 211. Specifically, each de-swirl vane 227 is coupled to receive diffused air from the first outlet 224 of the first diffuser 210 and to de-swirl the diffused air is it travels to the second diffuser 211, discussed below.

Also, in a preferred embodiment, the diffuser housing 221 further houses a bend 228 coupled between the first diffuser 210 and the de-swirl section 225. Preferably, this bend 228 provides a continuous turn between the first diffuser 210 and the de-swirl section 225, and bends the air from a predominantly radial diffuser (i.e., the first diffuser 210, in this preferred embodiment) to a predominantly axial diffuser (i.e., the second diffuser 211, in this preferred embodiment). However, this, along with certain other features described herein and/or depicted in FIG. 2 and/or the other Figures, may vary in other embodiments.

The diffuser housing 221 also includes and defines a first diffuser air inlet 222 and a first diffuser air outlet 224. The first diffuser air inlet 222 is disposed proximate a first diffuser leading edge 209, and is coupled between the impeller 206 and the first diffuser 210. The first diffuser 210 receives the compressed air from the impeller 206 via the first diffuser air inlet 222. The first diffuser air outlet 224 is disposed proximate a first diffuser trailing edge 213, and is coupled between the first diffuser 210 and the de-swirl section 225, and more specifically between the first diffuser 210 and the bend 228, in the depicted embodiment. The first diffuser 210 supplies the diffused and compressed air to via the first diffuser air outlet 224 to the bend 228, where the diffused and compressed air is further supplied to the de-swirl section 225.

The plurality of de-swirl vanes 227 are formed within the diffuser housing 221, and extend around the bend 228 between the first diffuser 210 and the second diffuser 211. The plurality of de-swirl vanes 227 define a plurality of de-swirl flow passages 240 through the de-swirl section 225. Each de-swirl flow passage 240 is in fluid communication with the first diffuser flow passage 238. While the plurality of de-swirl vanes 227 is depicted as having two rows of vanes, it will be appreciated that this may vary in other embodiments, for example in that there may be less than two rows of vanes or greater than two rows of vanes in various embodiments.

The second diffuser 211 is also preferably formed within the diffuser housing 221. The second diffuser 211 is configured to further diffuse and direct the compressed air toward and to the combustor 104. Specifically, in the depicted embodiment, the second diffuser 211 forms a second diffuser flow passage 248 through which air is transported and diffused after it is received by the second diffuser 211 from the first diffuser 210. In so doing, the second diffuser 211 additionally reduces the velocity of the air and increases the pressure of the air to a higher magnitude. The second diffuser 211 can be considered a pre-diffuser as the term is commonly used in the field in describing a diffuser disposed proximate the combustor of a gas turbine engine.

In a preferred embodiment, the second diffuser 211 is coupled to receive the compressed air from the first diffuser 210, preferably via the de-swirl vanes 227 of the de-swirl section 225. In one preferred embodiment, the second diffuser 211 comprises an axial diffuser that is disposed adjacent to the de-swirl section 225 and around the bend from the first diffuser 210.

In certain embodiment, the second diffuser 211 may include a plurality of second diffuser vanes (not depicted) formed within the diffuser housing 221, with each first diffuser vane defining a different second diffuser flow passage 248 through the second diffuser 211. However, this may vary in other embodiments.

In certain other embodiments, the second diffuser 211 may include one or more other housings other than the above-referenced diffuser housing 221 and/or housing 110. Also, as mentioned above, in certain embodiments the diffuser housing 221 may comprise the above-referenced housing 110, and/or may be formed within the diffuser housing 221.

In the depicted embodiment, the diffuser housing 221 further includes and defines a second diffuser air inlet 252 and a second diffuser air outlet 254. The second diffuser air inlet 252 is coupled between the de-swirl section 225 and the second diffuser 211, and is disposed proximate a second diffuser leading edge 249. The second diffuser 211 receives the compressed and de-swirled air from the de-swirl section 225 via the second diffuser air inlet 252. The second diffuser air outlet 254 is coupled between the second diffuser 211 and the combustor 104, and is disposed proximate a second diffuser trailing edge 253. The second diffuser 211 supplies the further diffused and compressed air to the combustor 104 via the second diffuser air outlet 254.

In a preferred embodiment described further below in connection with FIGS. 3 and 4, the gas turbine engine 100 further includes a plurality of fuel injectors that are each coupled to the combustor 104, and that are configured to supply fuel to the combustor 104. Also in a preferred embodiment, the second diffuser 211 includes various openings formed at least in part by one or more walls of the housing 110 and/or the diffuser housing 221, through which the fuel injectors may pass through when removed from the combustor. This allows the second diffuser 211 to be disposed in closer proximity to the combustor, to thereby minimize loss as air is transported from the second diffuser 211 to the combustor 104.

Figure 3:
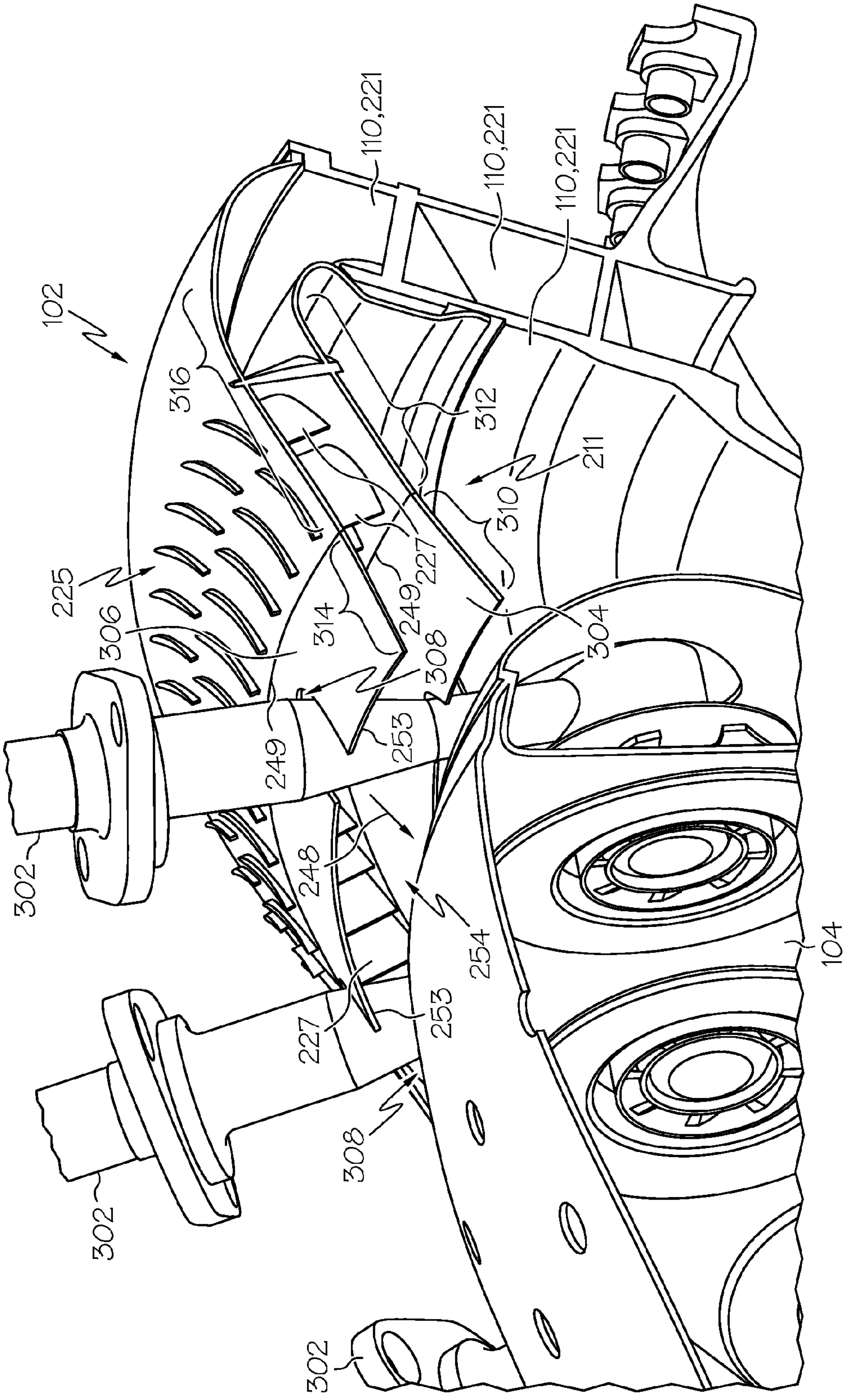
FIG. 3 is a cross sectional view of a portion of the compressor of FIG. 2, including a pre-diffuser thereof, and depicted along with a portion of the combustor of FIG. 2 and a plurality of replaceable fuel injectors that can be used in connection therewith, in accordance with an exemplary embodiment of the present invention.
Figure 4:
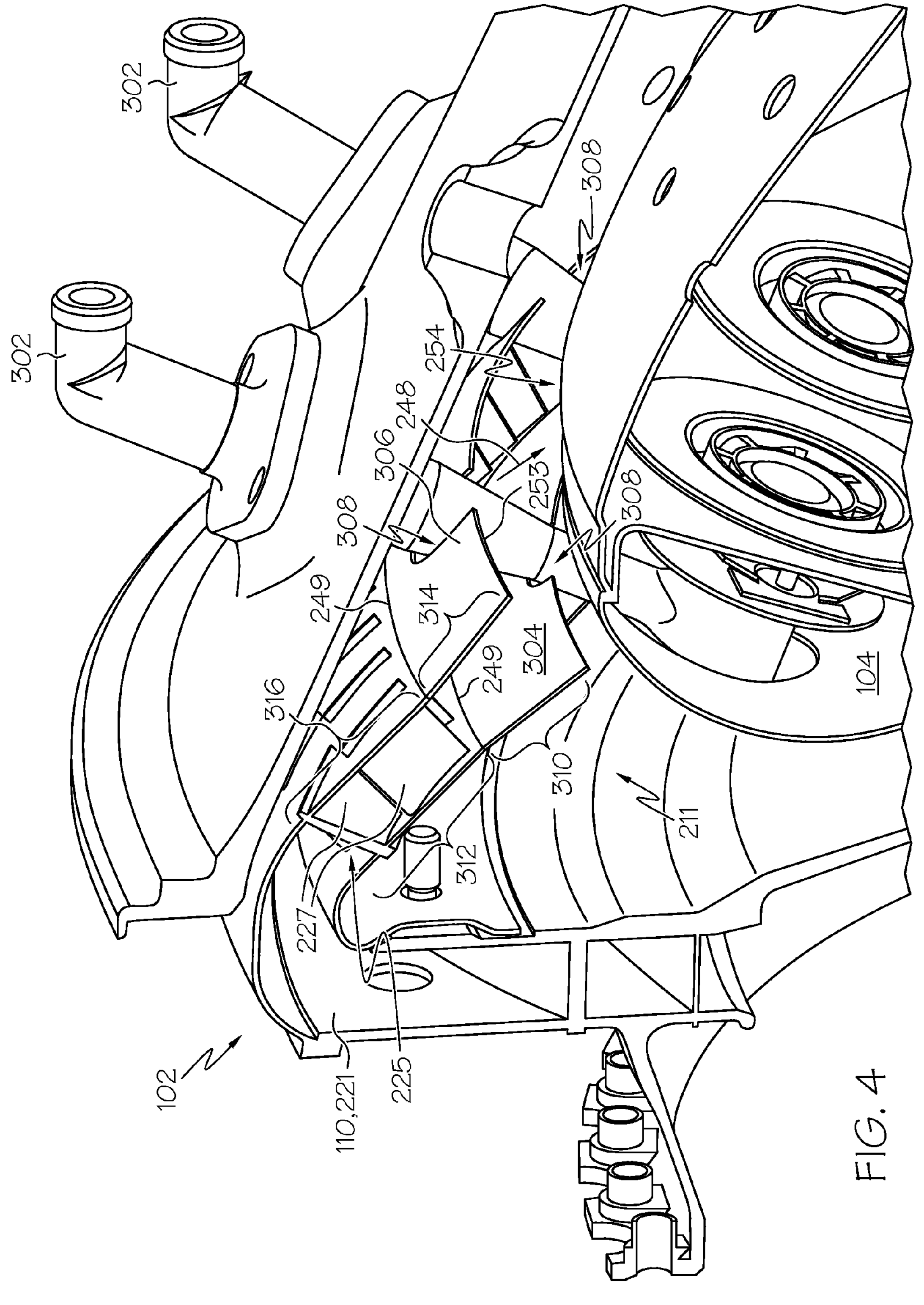
FIG. 4 is another cross sectional view of a portion of the compressor of FIG. 2, including a pre-diffuser thereof, and depicted along with a portion of the combustor of FIG. 2 and a plurality of replaceable fuel injectors that can be used in connection therewith, in accordance with an exemplary embodiment of the present invention.

FIGS. 3 and 4 illustrate various preferred features of the second diffuser 211 of FIG. 2, with different views in accordance with an exemplary embodiment of the present invention. Specifically, FIGS. 3 and 4 provide a top-angled view (FIG. 3) and a side-angled view (FIG. 4), respectively, of a cross section of a portion of the compressor 102 thereof, of FIG. 2, including the second diffuser 211 thereof, and depicted along with a portion of the combustor 104 of FIG. 2 and a plurality of replaceable fuel injectors 302 that can be used in connection therewith, in accordance with an exemplary embodiment of the present invention.

In the depicted embodiment, the fuel injectors 302 are coupled to the combustor 104, and are configured to supply fuel thereto. In addition, as shown in FIGS. 3 and 4, the fuel injectors 302 are removable through a portion, or opening, of the second diffuser 211, as set forth in greater detail below.

Specifically, in the depicted embodiment, the second diffuser 211 is formed at least in part by a first wall 304 and a second wall 306 of the diffuser housing 221 (which, in the depicted embodiment, comprises the housing 110, but may vary in other embodiments). The first and second walls 304, 306 form the above-referenced second diffuser flow passage 248 of the second diffuser 211 between the first and second walls 306, 306. In addition, the first wall 304 or the second wall 306, or both, further form a plurality of openings 308 therethrough for the fuel injectors 302 to pass through when removed from or inserted into the combustor 104. In the depicted embodiment, each opening 308 is formed through a portion of both the first and second walls 304, 306. However, this may vary in other embodiments, for example in that some or all of the openings 308 may be formed through a portion of only one of the first wall 304 or the second wall 306 in certain embodiments. Also in the depicted embodiment, the first and second walls 304, 306 form a separate opening 308 for each respective fuel injector 302, so that such respective fuel injector 302 can move through such separate opening 308 when being removed from or inserted into the combustor 104, for example for servicing. However, this may also vary in other embodiments.

Also in the depicted embodiment, the first wall 304 and the second wall 306 further form the above-referenced second diffuser air outlet 254 for the second diffuser flow passage 248 proximate the second diffuser trailing edge 253. The compressed air flows from the second diffuser flow passage 248 through the second diffuser air outlet 254 and toward the combustor 104. In a preferred embodiment, each opening 308 is formed also through at least a portion of the second diffuser air outlet 254. Specifically, in the depicted embodiment, each opening 308 is formed at least in part through portions of respective second diffuser trailing edges 253 of the first wall 304 and the second wall 306.

In addition, as depicted in FIGS. 3 and 4, in a preferred embodiment the second diffuser 211 and the de-swirl section 225 are both formed within the first and second walls 304, 306 within the diffuser housing 221 in the depicted embodiment. Specifically, in this embodiment, the first wall 304 comprises a first region 310 and a second region 312, while the second wall 306 comprises a third region 314 and a fourth region 316.

In a preferred embodiment, the first and second walls 304, 306 are at least substantially parallel to one another between their respective second and fourth regions 312, 316, in which the de-swirl section 225 is formed. The plurality of de-swirl vanes 227 are thus housed between the second region 312 and the fourth region 316 of the respective first and second walls 304, 306.

Also in a preferred embodiment, the first and second walls 304, 306 diverge between their respective first and third regions 310, 314, in which the second diffuser 211 is formed. Specifically, in a preferred embodiment, the distance between the first and second walls 304, 306 increases, preferably continuously, between the second diffuser leading edges 249 and the second diffuser leading edges 253 of the first and second walls 304, 306 (i.e., within their respective first and third regions 310, 314), to thereby provide for further diffusion of the compressed air as it travels along the second diffuser flow passage 248 in a direction toward the combustor 104.

In certain embodiments, the first diffuser 210 may also be formed within the first and second walls 304, 306 within the diffuser housing 221. However, this may vary in other embodiments.

In addition, while each of the fuel injectors 302 is depicted in the Figures as being disposed at least partially within one of the openings 308 in the assembled position, this may vary in other embodiments. For example, in certain other embodiments, the openings 308 may only be used for allowing movement of the fuel injectors 302 in and out, for example during installation, replacement, or maintenance. In such embodiments, one or more of the fuel injectors 302 may not be disposed within an opening 308 in the assembled position.

The configuration of the second diffuser 211 with the integrated openings 308 formed therein allows for closer coupling of the compressor 102 and the combustor 104, and allows for a second diffuser 211, or pre-diffuser, to be implemented in proximity to the combustor 104. As a result, this configuration allows for the velocity of the compressed air to be further reduced by the second diffuser 211, while minimizing pressure or drop loss of the compressed air before it reaches the combustor 104. In addition, the fuel injectors 302 can potentially be easily inserted, removed, and re-inserted into and from the combustor 104, for example during servicing.

Although the first and second diffusers 210, 211 are depicted and/or described herein as being implemented in a gas turbine engine 100 with a compressor 102 having an axial-centrifugal compressor 102, a two-stage turbine 106, and various other specific characteristics, it will be appreciated that the first and second diffusers 210, 211 and/or other aspects of the present invention can also be implemented in various other types of compressors, and in various types of engines, turbochargers, and various other fluid devices, and in various other systems and environments. However, regardless of the particular embodiments and implementations, the gas turbine engine 100, compressor 102, and/or various components thereof (for example, the second diffuser 211 with the openings 308 for the fuel injectors 302 to pass through when being removed from or inserted into the combustor 104) allows for implementation of a pre-diffuser in close proximity to a combustor of a gas turbine engine, with potentially reduced pressure loss, or dump loss, of air flow to the combustor, and without significantly increasing the length and/or size of the gas turbine engine 100, among other potential benefits.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A diffuser system for a compressor for a gas turbine engine, the compressor having an impeller and the gas turbine engine having a combustor with an inner wall, an outer wall, and an end wall cover upstream of the inner and outer walls and a fuel injector proximate to the combustor, the diffuser system comprising:

a first diffuser configured to receive compressed air from the impeller;

a second diffuser coupled to receive the compressed air from the first diffuser and supply the compressed air to the combustor, the second diffuser comprising a housing comprising a first wall and a second wall having a trailing edge, the first and second walls forming a diffuser flow passage therebetween and an outlet at the trailing edge of the second wall, the first wall and the second wall being separated by a varying distance that increases along a direction of flow within the diffuser flow passage, the first wall or the second wall, or both, forming an opening through the first and second walls and disposed within the diffuser flow passage, the fuel injector to pass through the opening to supply fuel to the combustor; and a deswirl section coupled between the first diffuser and the second diffuser, the deswirl section connected to the first diffuser and the second diffuser, the deswirl section comprising a plurality of de-swirl vanes formed within the housing and configured to deswirl the compressed air as it flows between the first diffuser and the second diffuser.

2. The diffuser system of claim 1, wherein the first wall and the second wall form the outlet for the diffuser flow passage for the compressed air to flow through toward the combustor, and the opening is formed also through at least a portion of the outlet.

3. The diffuser system of claim 1, wherein the opening is formed through both the first and second walls.

4. The diffuser system of claim 1, wherein:

the first wall comprises a first region and a second region, the second region being connected to the first region;

the second wall comprises a third region and a fourth region, the fourth region being connected to the third region;

the first wall and the second wall form the diffuser flow passage between the first region and the third region; and the plurality of de-swirl vanes are housed between the second region and the fourth region.

5. The diffuser system of claim 1, wherein the gas turbine engine further includes a plurality of additional fuel injectors proximate the combustor, and the first wall or the second wall, or both, further form a plurality of additional openings therethrough for the plurality of additional fuel injectors to pass through when removed from the combustor.

6. The diffuser system of claim 1, wherein:

the first diffuser is a radial diffuser; and the second diffuser is an axial diffuser.

7. The diffuser system of claim 1, wherein the first diffuser and the second diffuser are both formed integral to the compressor.

8. The diffuser system of claim 1, wherein the opening is disposed upstream of the outlet in which the air is deposited to the combustor.

9. The diffuser system of claim 1, wherein the first wall and the second wall are separate from the inner wall and the outer wall of the combustor.

10. The diffuser system of claim 1, wherein the combustor includes a combustor casing and the inner and outer walls, and the first wall and the second wall are independent from the combustor casing and the inner and outer walls of the combustor.

11. A compressor for a gas turbine engine having a combustor with an inner wall, an outer wall, and an end wall cover upstream of the inner and outer walls and a fuel injector proximate thereto, the compressor comprising:

a housing;

an impeller rotationally mounted within the housing and configured to supply compressed air;

a first diffuser formed within the housing and configured to receive the compressed air from the impeller; and a second diffuser formed within the housing and coupled to receive the compressed air from the first diffuser and supply the compressed air to the combustor, the second diffuser formed at least in part by a first wall and a second wall of the housing, the first wall and second wall with a trailing edge forming a diffuser flow passage of the second diffuser between the first and second walls and an outlet at the trailing edge of the second wall, the first wall and the second wall being separated by a varying distance that increases along a direction of flow within the diffuser flow passage, the first wall or the second wall , or both, forming an opening through the first and second walls and disposed within the diffuser flow passage, the fuel injector to pass through the opening to supply fuel to the combustor; and a deswirl section coupled between the first diffuser and the second diffuser, the deswirl section connected to the first diffuser and the second diffuser, the deswirl section comprising a plurality of de-swirl vanes formed within the housing and configured to deswirl the compressed air as it flows between the first diffuser and the second diffuser.

12. The compressor of claim 11, wherein the first wall and the second wall form the outlet for the diffuser flow passage proximate the end wall cover for the compressed air to flow through toward the combustor, and the opening is formed also through at least a portion of the outlet.

13. The compressor of claim 12, wherein the opening is formed through both the first and second walls.

14. The compressor of claim 11, wherein:

the first wall comprises a first region and a second region, the second region connected to the first region;

the second wall comprises a third region and a fourth region, the fourth region connected to the third region;

the first wall and the second wall form the diffuser flow passage between the first region and the third region; and the plurality of de-swirl vanes are housed between the second region and the fourth region.

15. A gas turbine engine, comprising:

a housing;

a turbine formed within the housing and configured to receive a combustion gas and operable, upon receipt thereof, to supply a first drive force;

a combustor formed within the housing and configured to receive compressed air and fuel and operable, upon receipt thereof, to supply the combustion gas to the turbine, the combustor having an inner wall, an outer wall, and an end wall cover upstream of the inner and outer walls;

a fuel injector coupled to the combustor and configured to supply the fuel thereto; and a compressor formed within the housing and configured to supply the compressed air to the combustor, the compressor comprising:

an impeller rotationally mounted within the housing and configured to supply the compressed air;

a first diffuser formed within the housing and configured to receive the compressed air from the impeller;

a second diffuser formed within the housing and coupled to receive the compressed air from the first diffuser and supply the compressed air to the combustor, the second diffuser formed at least in part by a first wall and a second wall of the housing, the first wall and second walls with a trailing edge forming a diffuser flow passage of the second diffuser between the first and second walls and an outlet at the trailing edge of the second wall, the first wall and the second wall being separated by a varying distance that increases along a direction of flow within the diffuser flow passage, the first wall or the second wall, or both, forming an opening through the first and second walls, the opening disposed within the diffuser flow passage, the fuel injector to pass through the opening to supply fuel to the combustor; and a deswirl section coupled between the first diffuser and the second diffuser, the deswirl section connected to the first diffuser and the second diffuser and comprising a plurality of de-swirl vanes formed within the housing and configured to deswirl the compressed air as it flows between the first diffuser and the second diffuser.

16. The gas turbine engine of claim 15, wherein the first wall and the second wall form the outlet for the diffuser flow passage proximate the end wall cover for the compressed air to flow through toward the combustor, and the opening is formed also through at least a portion of the outlet.

17. The gas turbine engine of claim 15, wherein the opening is formed through both the first and second walls.

18. The gas turbine engine of claim 15, wherein:

the first wall comprises a first region and a second region, the second region connected to the first region;

the second wall comprises a third region and a fourth region, the fourth region connected to the third region;

the first wall and the second wall form the diffuser flow passage between the first region and the third region; and the plurality of de-swirl vanes are housed between the second region and the fourth region.

19. The gas turbine engine of claim 15, wherein:

the first diffuser is a radial diffuser; and the second diffuser is an axial diffuser.

* * * * *